US008386097B2

(12) United States Patent
de Menorval et al.

(10) Patent No.: US 8,386,097 B2
(45) Date of Patent: Feb. 26, 2013

(54) METHOD AND DEVICE TO ASSIST IN THE GUIDANCE OF AN AIRPLANE

(75) Inventors: Jean-Louis de Menorval, Aussonne (FR); Fabrice Lucas, Toulouse (FR); David Gerasimovic, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 1309 days.

(21) Appl. No.: 12/046,231

(22) Filed: Mar. 11, 2008

(65) Prior Publication Data

US 2008/0228333 A1 Sep. 18, 2008

(30) Foreign Application Priority Data

Mar. 13, 2007 (FR) ..................................... 07 01789

(51) Int. Cl.
*G05D 1/00* (2006.01)

(52) U.S. Cl. .............. 701/10; 701/7; 701/120; 701/121; 701/122; 340/969; 340/978; 340/979

(58) Field of Classification Search ................ 701/7, 10, 701/16, 120, 121, 122; 340/969, 978, 979
See application file for complete search history.

(56) References Cited

U.S. PATENT DOCUMENTS

| | | | | |
|---|---|---|---|---|
| 5,051,910 | A * | 9/1991 | Liden | 701/204 |
| 5,121,325 | A * | 6/1992 | DeJonge | 701/123 |
| 5,408,413 | A * | 4/1995 | Gonser et al. | 701/204 |
| 5,574,647 | A * | 11/1996 | Liden | 701/8 |
| 6,507,782 | B1 * | 1/2003 | Rumbo et al. | 701/121 |
| 6,970,784 | B2 * | 11/2005 | Shinagawa | 701/204 |
| 7,026,956 | B1 * | 4/2006 | Wenger et al. | 340/971 |
| 7,283,895 | B2 * | 10/2007 | Bouchet | 701/3 |
| 7,623,960 | B2 * | 11/2009 | Wise et al. | 701/204 |
| 7,765,061 | B1 * | 7/2010 | Barber et al. | 701/206 |
| 7,818,118 | B2 * | 10/2010 | Ivansson et al. | 701/202 |
| 2003/0093219 | A1 * | 5/2003 | Schultz et al. | 701/202 |

FOREIGN PATENT DOCUMENTS

FR 2 888 636 1/2007

OTHER PUBLICATIONS

Preliminary Search Report dated Oct. 8, 2007.

* cited by examiner

*Primary Examiner* — Thomas Black
*Assistant Examiner* — Peter D Nolan
(74) *Attorney, Agent, or Firm* — Dickinson Wright PLLC

(57) ABSTRACT

Disclosed is a method and device for assisting guidance of an aircraft. A flight management system is used to determine guidance instructions that include speed instructions having at least one flight time constraint to guide the aircraft to a check-point. An accuracy level for complying with the flight time constraint and at least one error level for at least one flight parameter are generated by an accuracy generating unit. An operating margin for at least one second parameter is determined from the determined accuracy and error levels, with the operating margin being representative of air speed criterion values of the aircraft. A range determining unit is used to determine whether the range of air speed criterion values is within an air speed envelope of the aircraft, and the speed instructions are modified when the range of air speed criterion values is not within the air speed envelope.

6 Claims, 2 Drawing Sheets

TIME CONSTRAINT ENTRY UNIT
FLIGHT MANAGEMENT SYSTEM
SPEED INSTRUCTION MODIFIER
FLIGHT COMPUTER
ACTUATOR
CONTROL UNIT
5
2
19
10
11
8
9
12
6
4
7
3
INFORMATION SOURCES
ACTUATOR
CONTROL UNIT
25
24
DISPLAY SCREEN
1
16
18
20
14
15
17
ACCURACY GENERATIONS UNIT
MARGIN DETERMINING UNIT
RANGE DETERMINING UNIT
22
DISPLAY UNIT

METHOD AND DEVICE TO ASSIST IN THE GUIDANCE OF AN AIRPLANE

FIELD OF THE INVENTION

The present invention relates to a method and a device to assist in the guidance of an aircraft, in particular a transport airplane.

BACKGROUND OF THE INVENTION

Although not exclusively, the present invention applies more particularly to the guidance of aircraft, such as in particular civilian transport airplanes, throughout the flight to comply with a target passage time at a given point. This point can in particular be located in a landing phase (descent, approach). It is known that a landing phase is normally monitored and managed by air traffic controllers. One of the tasks of an air traffic controller is to ensure that, at a particular (convergence) point in space, the various aircraft converging towards this particular point comply with a sequence of arrival times. This sequence of arrival times at this point can be supplied to him, for example, by a standard system located on the ground which automates the traffic planning. The air traffic controller must then give guidance instructions to the crews of the various aircraft, to maintain a satisfactory separation between two successive aircraft and to ensure that said aircraft comply with the sequence of arrival times at said convergence point with a certain accuracy.

In areas with high traffic density, such a standard sequencing management represents a significant workload for an air traffic controller, which is made increasingly complex because of the continual growth in air traffic.

Furthermore, the time lapse between two successive instructions from the controller to one and the same crew can become relatively great, of the order of some tens of seconds, and even sometimes be as long as a minute. Such a guidance of the aircraft, based on instructions transmitted from the ground, therefore does not offer sufficient accuracy and must be offset by imposed separation minima between two aircraft that are sufficiently great. This of course has the drawback of limiting the density of the air space.

Furthermore, such a standard sequencing management makes it possible to deliver clearances for paths that are optimized in terms of traffic flow management, but to the detriment in particular of parameters specific to each aircraft, which can be very sensitive, for example for airlines, such as fuel consumption, engine wear, arrival time at the airport or sound emissions. In particular, it is known that, in very dense traffic, the air traffic controller often has a very small deconfliction horizon (of the order of a few minutes) and frequently uses a technique called "path stretching" to accurately sequence the aircraft. This standard technique involves reducing or increasing the length of the path of an aircraft, to adjust the passage times of the various aircraft at a given point. More often than not, such a procedure is performed by radar vectoring, by placing the aircraft on a level at low altitude. This delayed adjustment of the path, associated with a guidance that is not generated by a flight management system of the aircraft, does not make it possible to deliver an optimized path for said aircraft, and it often proves costly in particular in terms of fuel consumption and environmental impact (sound emissions, gas emissions, etc.).

Document FR-2 888 636 discloses a device to assist in the approach, with a view to a landing. This device is mounted on an aircraft and uses a standard flight management system and guidance system.

Moreover, a method is known according to which:

a) an operator enters at least one time constraint of RTA (Required Time of Arrival) type, relating to a required passage time at a particular check-point, in particular a convergence point as mentioned above, in a flight of the aircraft;

b) the values of parameters relating to the flight of the aircraft, such as wind or temperature for example, are determined; and c) said values and said time constraint are used to determine guidance instructions that make it possible to guide the aircraft so that it passes said particular check-point at said required passage time; and d) these guidance instructions are applied to the aircraft.

The entry of an RTA time constraint relating to a particular check-point, for example in a Flight Management System (FMS), makes it possible to fly the aircraft along a path (called reference path) which is optimized in terms of aircraft parameters, but it does not provide the controller with a simple solution for safely accomplishing the sequencing of the aircraft at the desired check-point.

In practice, in particular, the flight management system does not anticipate the fact that the parameters (for example wind, temperature, the position of the aircraft) taken into account in the calculation of the guidance instructions can be unreliable. These parameters which are entered into the flight management system (including values entered at the waypoints and interpolations made between the waypoints) can be significantly different from the actual parameters that will be encountered by the aircraft from its current position to the point where the time constraint is entered. In particular, with respect to wind and temperature, the difference between the entered values and the actual values can be fairly great, mainly because of the poor accuracy of the weather data concerning wind and temperature, which are transmitted to the crew. This difference therefore renders the abovementioned standard method unreliable. In particular, this standard method does not offer a guarantee of compliance with an RTA time constraint entered at a given point, and this even if the flight management system initially announces (on completion of the entry of this time constraint) that the latter will be complied with. These limitations of the RTA function therefore render its operational use difficult.

Document U.S. Pat. No. 5,121,325 discloses a system for calculating and displaying a range of possible arrival times of an aircraft at a particular point. The minimum arrival time of this range corresponds to the case where the aircraft flies with the highest cost index, and the maximum arrival time corresponds to the case where the aircraft flies with the lowest cost index. This range of arrival times therefore concerns estimates of arrival times at a check-point concerned for speeds of the aircraft ranging from the lowest to the highest. However, these estimates are calculated only with the winds that have been entered into the flight management system, without taking account of possible errors regarding the wind values used. The range (or RTA window) displayed is therefore unreliable, since no guarantee is given to the pilot that the times displayed can be complied with, in particular in the case where the entered winds (or other entered parameters) are wrong, which often happens.

SUMMARY OF THE INVENTION

The present invention relates to a method to assist in the guidance of an aircraft, which makes it possible to remedy the abovementioned drawbacks.

To this end, according to the invention, said method whereby:

a) at least one time constraint is generated relating to a required passage time (of the aircraft) at a particular check-point in a flight of the aircraft;

b) the values of first parameters (wind, temperature, etc.) relating to the flight of the aircraft are determined; and c) these values and said time constraint are used to determine guidance instructions (including speed instructions) that are used to guide the aircraft so that it passes said particular check-point at said required passage time, is noteworthy in that, in addition:

- in the step a), an accuracy level for complying with said time constraint and at least one error level for at least one of said first parameters (wind, temperature, etc.) are generated; and
- in the step c):
  - c1) an operating margin for at least one second parameter is deduced from said accuracy level and from said error level, which is representative of the air speed level of the aircraft, said operating margin representing a range of values comprising all the values that said second parameter can take in a flight to said check-point because of the existence of a correction margin (or error margin) due to said accuracy level and to said error level (relating to the first parameter);
  - c2) a check is carried out to see if this range of values is included in an air speed envelope, said air speed envelope comprising air speeds at which the aircraft can fly (according to its performance characteristics in particular) between its current position and said particular check-point; and
  - c3) if said range of values is not included in said air speed envelope, said speed instructions and said range of values are modified so as to obtain a new range of values which is included in said air speed envelope between the current position of the aircraft and said particular check-point.

Furthermore, advantageously, in a subsequent step d), said guidance instructions are applied to the aircraft during a flight, and this as far as said check-point.

Thus, thanks to the invention, account is taken in the calculation of the guidance instructions:

- on the one hand, of an accuracy level which relates to the compliance with the time constraint (for example of RTA type) at said check-point; and
- on the other hand, of an error level. Preferably, this error level relates to at least one of the following errors:
  - a (maximum) error between the actual value of the first parameter during the flight and the value (of this first parameter) that is taken into account to determine the guidance instructions; and
  - a (maximum) modeling error relating to this first parameter.

Preferably, in the step c1), to determine said operating margin, a range is used that comprises the possible values of said first parameter, for example wind, temperature or the position of the aircraft, a range that is representative of said error level.

It will be noted that said accuracy level illustrates the maximum difference that must be observed, with a determined probability level, between the required passage time (generated in the step a) and the actual passage time at said check-point.

Hereinbelow, the expression "reliability level" will be used to denote the level of probability associated with the compliance, to within an error margin (corresponding to said accuracy level), with the required passage time.

Consequently, thanks to the invention, the time constraint can be complied with not only with a given accuracy but also with a fixed reliability level, which makes it possible to remedy the abovementioned drawbacks.

The present invention also offers the following advantages:

- it enables an air traffic controller to know and impose, with the required reliability level and with the accuracy level suited in particular to the area being controlled, the passage time of an aircraft at a predefined check-point (in particular a convergence point of the abovementioned type). This control of the passage times of the aircraft at a given check-point makes it possible to assist the air traffic controller in sequencing aircraft with a level of precision suited to the controlled area. The application of the method according to the invention is particularly well suited to dense spaces, for which it is necessary to precisely sequence the aircraft; and
- it makes it possible to guide an aircraft on reference paths incorporating standard constraints of ATM (Air Traffic Management) type, in particular in time, but calculated by a flight management system, therefore in the most optimum way possible from the point of view of fuel consumption, engine wear and environmental impact.

In a particular embodiment, in the step a), a plurality of error levels are generated relating respectively to a plurality of first different parameters, such as wind, temperature and the position of the aircraft in particular.

Furthermore, advantageously, in the step c1), a plurality of operating margins are determined, respectively relating to a plurality of second different parameters (or air speed criteria) and said steps c2) and c3) are applied for all these operating margins.

It will be noted that an air speed criterion can be representative, for a civilian transport airplane, of the strategy of the airline for the speed level that the aircraft must maintain during a flight. In a first embodiment, said air speed criterion is determined simply using a standard cost index CI which is defined from the expression:

$$CI=CT/CC$$

in which:

- CC is the cost linked to flight time (upkeep, crew, etc.), expressed in kg/min; and
- CT is the fuel cost, expressed in $/kg.

Thus, the lower the cost index CI, the lower the fuel consumption and the greater the action radius, and the greater the cost index CI, the lower the flight time and the greater the speeds.

Furthermore, in a second embodiment, said air speed criterion corresponds, for a particular flight position of the aircraft between its current position and said check-point, to an air speed ratio R, which satisfies the following relation:

$$R=(V\max-V)/(V\max-V\min)$$

in which:

- V is the air speed used to calculate said speed instructions for said particular flight position;
- Vmax is the maximum air speed in said air speed envelope for said particular flight position; and
- Vmin is the minimum air speed in said air speed envelope for said particular flight position.

Moreover, in a first embodiment variant, said air speed envelope corresponds to a complete range of air speeds to said check-point. Furthermore, in a second embodiment variant, said air speed envelope corresponds to a predetermined range of air speeds, which represents a subrange of said complete range. This subrange can, for example, be limited to a known range (of air speeds) or to a range (of air speeds) imposed by an air traffic controller. The latter possibility can in particular assist the air traffic controller in managing the separations between different aircraft.

Moreover, in a preferred embodiment:

- a reliable time domain is also determined which corresponds to a passage time domain that the aircraft can observe at said check-point with said accuracy level, and this for a particular probability level; and
- there is presented, on a display screen, to a pilot of the aircraft:
  - if said reliable time domain has been determined, that is, could be determined, a graph (preferably in the form of a window) illustrating this reliable time domain; and
  - if said reliable time domain could not be determined, information indicating this impossibility.

This time domain is therefore a reliable time domain, since it designates the passage times that the aircraft can comply with at the check-point with said given accuracy level and with a certain reliability level (illustrated by said required probability level). It will be noted that this is not the case with the RTA window determined by the abovementioned document U.S. Pat. No. 5,121,325, since this prior document performs estimations using parameters that have been entered, in particular the wind that has been entered, without taking account of possible errors on the parameters that have been entered. Therefore, unlike the reliable time domain according to the present invention, this displayed RTA window does not guarantee to the pilot that the displayed times can be complied with in the case where the parameters that have been entered are wrong. The present invention therefore makes it possible to remedy the drawbacks of the system disclosed by the document U.S. Pat. No. 5,121,325.

Furthermore, advantageously,

- means are provided that enable an operator, in particular a pilot of the aircraft, to enter a time constraint value for said check-point;
- any time constraint value, entered by the operator, is compared to said abovementioned reliable time domain; and
- if a time constraint value is located outside of said reliable time domain, the operator is notified.

On the other hand, if a time constraint value that has been entered is located in said reliable time domain, a servo-controlling of the guidance of the aircraft is advantageously implemented so that it reaches said check-point with said time constraint value (entered by the operator) with said abovementioned accuracy and probability levels.

The present invention also relates to a device to assist in the guidance of an aircraft, in particular a transport airplane.

According to the invention, said device, which is onboard and which is of the type comprising:

- means making it possible, in particular for an operator such as a pilot for example, to enter at least one time constraint (for example of RTA type) relating to a passage time at a particular check-point in a flight of the aircraft;
- means for determining the values of first parameters relating to the flight of the aircraft; and
- means for determining, using said values and said time constraint, guidance instructions comprising speed instructions that make it possible to guide the aircraft so that it passes said particular check-point at said passage time, is noteworthy in that it also comprises:

- means for generating an accuracy level for observing said time constraint and at least one error level for at least one of said first parameters;
- means for deducing, from said accuracy level and from said error level, an operating margin for at least one second parameter, which is representative of the air speed level of the aircraft. This operating margin represents a range of values comprising all the values that said second parameter can take, in a flight to said check-point, because of the existence of an error margin (or correction margin) (due to said accuracy level and to said error level relating to the first parameter);
- means for checking whether this range of values is included in an air speed envelope. This air speed envelope comprises air speeds at which the aircraft can fly (according to its performance characteristics) between its current position and said particular check-point; and
- means for modifying said speed instructions if this range of values is not included in said air speed envelope. According to the invention, in this case, said speed instructions (of said guidance instructions) and thus said range of values are modified so as to obtain a new range of values that is included in said air speed envelope between the current position of the aircraft and said particular check-point.

Furthermore, in a preferred embodiment, said device also comprises standard means for applying said guidance instructions to flight controls of the aircraft, during a flight, and this as far as said check-point.

BRIEF DESCRIPTION OF THE DRAWINGS

The figures of the appended drawing will clearly show how the invention can be implemented. In these figures, identical references denote similar elements.

DETAILED DESCRIPTION OF THE INVENTION

Figure 1:
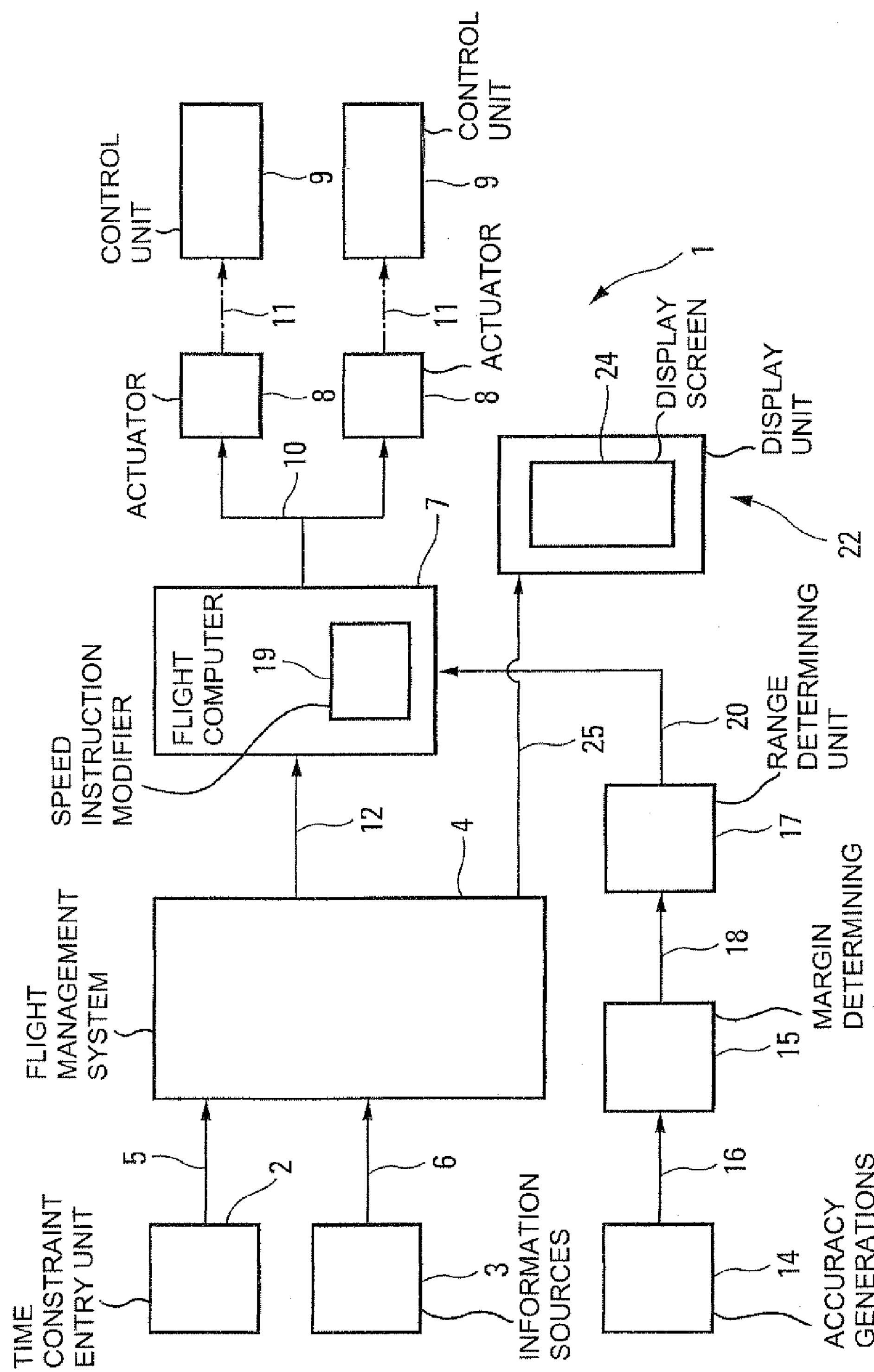
FIG. 1 is the block diagram of a guidance aid device according to the invention.

The device 1 according to the invention and diagrammatically represented in FIG. 1 is intended to assist the crew of an aircraft (not represented), in particular of a transport airplane (civilian or military), in a flight of said aircraft, in particular with a view to a landing on a runway.

According to the invention, said device 1 which is onboard the aircraft usually comprises:

- standard means 2, for example a keyboard, enabling an operator, in particular a pilot of the aircraft, to enter at least one RTA-type time constraint, which indicates a required passage time at a particular check-point, for example a convergence point of the abovementioned type, that the aircraft must comply with in a flight;
- a system 3 of information sources that can determine values of first parameters, such as wind, temperature or the position of the aircraft, which relate to the flight of the aircraft;
- means 4, for example a Flight Management System (FMS) which are linked via links 5 and 6 respectively to said means 2 and to said system 3, which receive information from the latter, and which perform processing operations specified hereinbelow, and determine in particular from this information a reference path;

means 7, for example a flight computer of FG (Flight Guidance) type, which are linked via a link 12 to said means 4, which receive information from the latter, in particular said values determined by said system 3 and said time constraint entered using said means 2, and which determine from this information guidance instructions which include speed instructions. These guidance instructions are such that they make it possible to guide the aircraft so that it passes said particular check-point at said passage time; and standard means 8 of actuating control units 9 of the aircraft, which can act on the flight of the aircraft A, for example control surfaces (lateral, depth, roll) of said aircraft. Said actuation means 8 receive the guidance commands generated by said means 7 via a link 10 and correspondingly actuate said control units 9, as illustrated by a link 11 in chain dotted lines in FIG. 1.

According to the invention, said device 1 also comprises:

means 14 for generating an accuracy level for complying with said RTA time constraint and at least one error level for at least one of said first parameters (wind, temperature, position of the aircraft);

means 15 which are linked via a link 16 to said means 14 and which are formed to deduce, from said accuracy level and from said error level, an operating margin for at least one second parameter which is used (by said means 7) to determine said guidance instructions, which is representative of the air speed level of the aircraft and which is called air speed criterion in the description below. This operating margin represents a range of values comprising all the values that said second parameter can take around the speed instructions, in a flight of the aircraft as far as said check-point, because of the existence of a correction margin (due to both said abovementioned accuracy level and said abovementioned error level);

means 17 which are linked via a link 18 to said means 15 and which are formed in such a way as to check whether this range of values is included in an air speed envelope. This air speed envelope comprises air speeds at which the aircraft can fly (according in particular to its performance characteristics) between its current position and said particular check-point (at which said RTA time constraint must be complied with); and means 19 which are, for example, incorporated in said means 7 and which are formed in such a way as to modify said speed instructions if the means 17 inform them (via a link 20) that said range of values is not included in said air speed envelope.

According to the invention, said means 17 modify said speed instructions (of said guidance instructions) and thus said range of values so as to obtain a new range of values which is included in said air speed envelope between the current position of the aircraft and said particular check-point.

Thus, the device 1 according to the invention takes account in calculating the guidance instructions:

on the one hand, of an accuracy level which relates to the compliance with the time constraint (for example of RTA type) at said check-point; and on the other hand, of an error level. Preferably, this error level relates to at least one of the following errors:

a (maximum) error between the actual value of the first parameter (wind, temperature, etc.) during the flight and the value (of this first parameter) received from said system 3 and taken into account to determine the guidance instructions; and a (maximum) modeling error relating to this first parameter. This error relates to a processing model of said first parameter which is, for example, incorporated in the means 4.

To determine said operating margin, said means 15 preferably use a range comprising the possible values of said first parameter (for example wind, temperature or the position of the aircraft), a range that is representative of said error level.

It will be noted that said accuracy level illustrates the maximum difference that must be observed, with a particular probability level, between the required passage time (entered using the means 2) and the actual passage time at said check-point.

Hereinbelow, the expression "reliability level" will be used to denote the probability level associated with the compliance, to within an error margin (corresponding to said accuracy level), with the required passage time.

Consequently, thanks to said device 1, a time constraint can be complied with not only with a given accuracy but also with a fixed reliability level.

The device 1 according to the invention also presents the following advantages:

it enables an air traffic controller to know and impose, with the required reliability level and with the accuracy level suited in particular to the area being controlled, the passage time of an aircraft at a predefined check-point (in particular a convergence point of the abovementioned type). This control of the aircraft passage times at a given check-point makes it possible to assist the air traffic controller in sequencing the aircraft with a level of precision suited to the area being controlled. The present invention is particularly suited to dense spaces, for which it is necessary to precisely sequence the aircraft; and it makes it possible to guide an aircraft on reference paths incorporating the usual air traffic management (ATM) type constraints, in particular in time, but calculated by a flight management system such as the means 4 for example, therefore in the most optimal way possible from the point of view of fuel consumption, engine wear and environmental impact.

In a particular embodiment, the means 14 specified hereinbelow generate a plurality of error levels respectively relating to a plurality of first different parameters such as wind, temperature and the position of the aircraft in particular.

Moreover, in a particular embodiment, the means 15 determine a plurality of operating margins relating respectively to a plurality of second different parameters (or air speed criteria), and the means 17 perform the abovementioned checks for all of these operating margins.

It will be noted that an air speed criterion can be representative, for a civilian transport airplane, of the airline strategy for the speed level that the civilian transport airplane must observe during a flight. In a first embodiment, said air speed criterion is determined simply using a standard cost index.

Furthermore, in a second embodiment, said air speed criterion corresponds, for any particular flight position of the aircraft between its current position and said check-point (associated with the RTA time constraint), to an air speed ratio R, which satisfies the following relation:

$$R=(V\max-V)/(V\max-V\min)$$

in which:

V is the air speed used by the means 7 to calculate said speed instructions for said particular flight position;

Vmax is the maximum air speed in said air speed envelope for said particular flight position; and Vmin is the minimum air speed in said air speed envelope for said particular flight position.

Moreover, in a first embodiment, said air speed envelope corresponds to the complete range of air speeds that comprises all the air speeds at which the aircraft can fly (according to its performance characteristics) to said check-point. Furthermore, in a second embodiment, said air speed envelope corresponds to a predetermined range of air speeds, which represents a subrange of said complete range. This subrange can be limited to a known range (of air speeds) or to a range (of air speeds) imposed by an air traffic controller. This makes it possible in particular to assist the air traffic controller in managing the separations between different aircrafts.

In a particular embodiment, said means 15 and 17 can be incorporated in the means 4 which correspond, preferably, to a flight management system. Furthermore, in a particular embodiment, said means 2 and 14 can be part of one and the same interface intended for entering parameters into a flight management system.

According to the invention, said means 2 and/or said means 14 can comprise means, such as, for example, a keyboard, which enable an operator, in particular a pilot of the aircraft, to directly and manually enter parameters respectively into the means 4 and 15. In another embodiment, as a complement or as a variant, these means 2 and/or 14 can comprise data reception means which make it possible to automatically receive input parameters from outside the aircraft, in particular from the ground. In this case, the reception of the information results from the acceptance by the pilot of a clearance sent by the ground, for example via a pilot/controller data transmission system of CPDLC (Controller Pilot Data Link Communications) type, which is associated with said data reception means. Said means 2 and/or 14 can also include other information sources which include, for example, a navigation database.

Moreover, in a preferred embodiment:

said means 4 also determine a reliable time domain corresponding to a passage time domain that the aircraft can observe at said check-point with said accuracy level, and this for a particular probability (that is, reliability) level; and display means 22 of the device 1, which are linked via a link 25 to said means 4, present on a display screen 24:

if said reliable time domain has been determined, that is, could be determined by said means 4, a graph (or reliable RTA window 26) illustrating this reliable time domain; and if said reliable time domain could not be determined, information indicating this possibility.

This time domain (reliable RTA window 26) is therefore a reliable time domain, since it designates the passage times that the aircraft can comply with at said check-point with said given accuracy level and with a certain reliability level (illustrated by said required probability level).

Furthermore, in a particular embodiment, said device 1 also comprises:

means, preferably said means 2 (or said means 14), enabling an operator, in particular a pilot of the aircraft, to enter a new time constraint value for said check-point;

means (not represented), which are for example incorporated in said means 4 and which compare any time constraint value entered by the operator with said abovementioned reliable time domain (reliable RTA window 26); and means, for example said display means 22, which warn the operator if said time constraint value is located outside of said reliable time domain. The latter means can also include audible warning means.

On the other hand, if an entered time constraint value is located within said reliable time domain (reliable RTA window 26), the means 7 usually servo-control the guidance of the aircraft so that it reaches said check-point with said time constraint value (entered by the operator) with the corresponding accuracy and probability levels.

There follows hereinbelow a detailed description of a particular embodiment of the invention which is limited, by way of illustration, to taking into account errors on a model (used by the means 4 for example) concerning wind (which therefore corresponds to a first value of abovementioned above).

It will be noted that several input parameters must be defined:

the point at which the crew of the aircraft wants to enter an RTA time constraint into the device 1;

the value of the error margin (or accuracy level) associated with the RTA time constraint;

the value of the maximum wind error (associated with the required reliability level) that the device 1 must allow for between the position of the aircraft and the check-point with which said RTA time constraint has been associated; and where appropriate, an air speed range which is imposed by an air traffic controller.

The size of the range of winds concerned directly corresponds to the reliability level with which the time constraint must be observed with an accuracy (or accuracy level) equal to said error margin value. The maximum value of the wind error allowed for as headwind and as tailwind will be the same. The device 1 maps the reliability level to the maximum wind error allowed for. The reliability level is all the greater as the size of the range of wind errors concerned increases. During a flight, the amplitude of the winds that the aircraft encounters varies with, for example, strong winds at high altitude and light winds at low altitude. Consequently, for the required reliability level, different maximum wind errors must be taken into account, in theory, in the flight towards said check-point. Therefore, in a first embodiment, several maximum wind error values are entered. Each of these maximum wind error values corresponds to a part of the reference path (which represents the path to be followed by the aircraft to said check-point).

On the other hand, in a second (simplified) embodiment, the device 1 takes into account just one maximum wind error value, namely the highest of all the maximum wind error values allowed for along the reference path.

It will be noted that the wind errors are due mainly to the fact that the wind weather data that is transmitted to the crew of the aircraft is, normally, imprecise.

Once these parameters are entered, the means 4 check whether a reliable time domain (or reliable RTA window 26) exists, and if such a reliable RTA window 26 does exist, said means 4 determine this reliable RTA window 26. To do this, said means 4 initially evaluate a range of passage times 27 that it is possible to observe for the required reliability level (without taking account of the accuracy level), and this in the manner specified hereinbelow.

It is known that, to within a given wind error (in the range of wind errors concerned), a range of possible passage times at the check-point corresponds to all the air speed criteria that are included in the complete range of air speed criteria. The intersection of all these ranges of passage times corresponds to the range of the passage times 27 that it is possible to observe, and amounts at the intersection of the associated time ranges respectively:

to the maximum wind error (possibly variable along the reference path) allowed for for a headwind; and to the maximum wind error (possibly variable along the reference path) allowed for for a tailwind.

Figure 3:
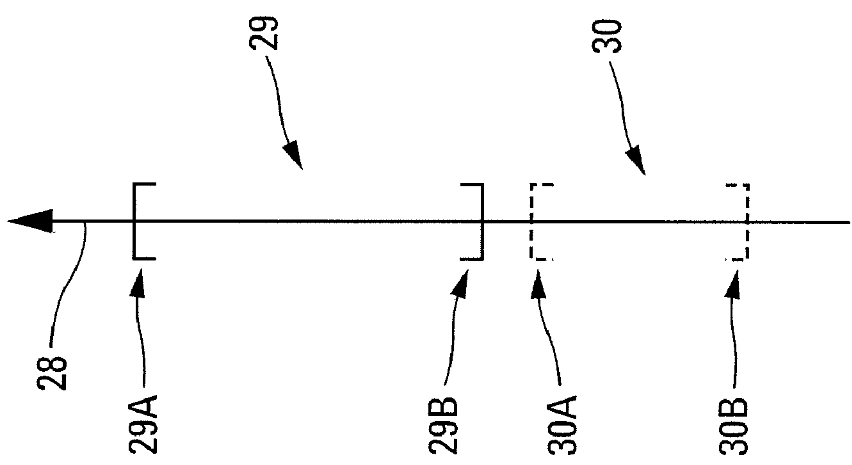
FIGS. 2 and 3 are graphics illustrating a way of determining a range of passage times.
Figure 2:
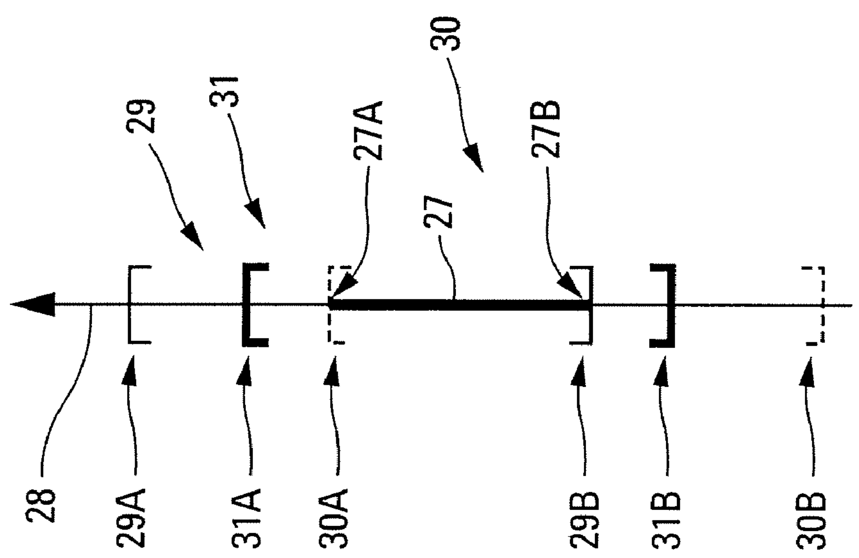

FIGS. 2 and 3 illustrate this situation. More specifically, FIG. 2 corresponds to the case where a range of passage times 27 can be determined. This range of passage times 27 which can be observed for the required reliability level is shown by a segment in thick solid lines. This segment is defined by ends 27A and 27B which illustrate maximum wind errors, respectively with tailwind and headwind.

This range of time 27 is obtained from the intersection of the following ranges, which are defined each time by extreme (or limit) values along a straight line 28 illustrating the predicted passage time at said check-point concerned:

a range of passage times 29 (comprising limits 29A and 29B) with the maximum wind allowed for for a headwind and with the complete range of air speed criteria;

a range of passage times 30 (comprising limits 30A and 30B) with the maximum wind allowed for for a tailwind and with the complete range of air speed criteria; and a range of passage times 31 (comprising limits 31A and 31B) with a wind in the range of winds concerned and with the complete range of air speed criteria.

The limits 29A, 30A and 31A correspond to minimum air speed criteria, and the limits 29B, 30B and 31B correspond to maximum air speed criteria.

On the other hand, FIG. 3 illustrates the case where no range of passage times can be determined. In this case, there is no intersection between the time ranges 29 and 30. Such is, for example, the case when the speed envelope used by the means 4 (or the range of air speeds imposed by an air traffic controller) is reduced in relation to the wind errors allowed for.

To determine said range of passage times 27 which can be observed for the required reliability level, it is therefore sufficient, taking into account the abovementioned information in relation to FIGS. 2 and 3, for the means 4 to proceed as follows.

Said means 4 calculate predictions by assuming that the aircraft will fly with the maximum air speed criterion (corresponding to the top limit of the air speed envelope) to the check-point, but that the aircraft will be faced with a constant headwind, the amplitude of which corresponds to the maximum wind error value or values concerned. tmin is taken to be the passage time that the means 4 predict, given this assumption, at said check-point.

The means 4 also calculate predictions by assuming that the aircraft will fly with the minimum air speed criterion to said check-point, but that the aircraft will be faced with a constant tailwind, the amplitude of which corresponds to the maximum wind error value or values concerned. tmax is taken to be the passage time that the means 4 predict, given this assumption, at said check-point.

The means 4 then compare these times tmin and tmax, and deduce from them:

if tmin is less than or equal to tmax, that the range of passage times 27 that it is possible to observe for the required reliability level is equal to the interval [tmin; tmax]; and if tmin is greater than tmax, that no passage time can be observed with the required reliability level.

The means 4 then determine the reliable RTA window 26. If the range of passage times that can be observed with the required reliability level does not exist, it is no longer possible to terminate a reliable RTA window. In this case, the device 1 informs the pilot of this, for example based on an appropriate indication presented on the screen 24.

Figure 4:
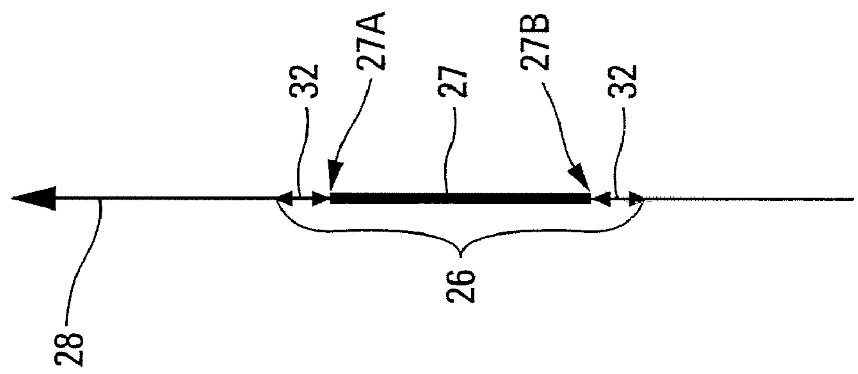
FIG. 4 is a graphic illustrating a reliable time domain.

On the other hand, if the range 27 of the passage times that can be observed with the reliability level does exist, it is sufficient for the means 4 to add, either side of said time range 27 (at the ends 27A and 27B) that can be observed with the maximum wind error considered, a time that is equal to the accuracy level requested, that is, to the value of the error margin, as represented in FIG. 4.

This FIG. 4 shows, along the straight line 28 illustrating the predicted passage time at said check-point:

in thick solid line, the range of passage times 27 that can be observed for the required reliability level;

either side of this range of passage times 27, said error margin 32 illustrating said accuracy level; and said reliable RTA window 26 which evolves from this.

The reliable RTA window 26 obtained in this way is displayed on the display screen 24. This reliable RTA window 26 is refreshed, in real time, during the flight, as are the predictions made by the means 4.

When, in this case, a crew member decides to enter into the device 1, using the means 2 (or means 14), a particular RTA time constraint, two situations can occur. Firstly, the RTA time constraint entered is located outside of said reliable RTA window 26. In this case, the device 1 indicates to the pilot, preferably via information displayed on the screen 24, that said RTA time constraint entered with the requested accuracy level cannot be guaranteed to be observed with the maximum wind error (reliability level) allowed for.

Secondly, the RTA time constraint entered is located within said reliable RTA window 26. In this case, two embodiment variants are possible.

These two embodiment variants are described hereinbelow.

The first embodiment variant corresponds to a logic that works directly on the point where the RTA time constraint is entered by the crew member. The device 1 evaluates the range of air speed criteria that makes it possible to reach, by taking into account the range of possible wind errors, said check-point in a time included in the interval [RTA−error margin; RTA+error margin]: called interval i1 hereinbelow.

In this case, the following considerations are taken into account. Since the RTA time constraint is located in the reliable RTA window 26, there are two possibilities to consider:

the interval i1 is included in the range of passage times 27 that can be observed for the required reliability level; or only a subinterval of this interval i1 is included in this range of possible passage times 27. This happens in particular when the RTA time constraint entered is located close to the limits of the reliable RTA window 26.

An interval i2 is also considered, which represents the range of air speed criteria sought. To obtain this range, the means 4 limit the complete range of the air speed criteria to the subinterval of the air speed criteria which corresponds to the passage time interval i1.

The reference path is then recalculated taking into account an air speed criterion which is located within the interval i2. In the context of the present invention, there are several possibilities for choosing the value of the air speed criterion within the interval i2.

A first method consists in choosing it according to considerations regarding the wind error. For example, the value of the air speed criterion can be that for which the means 4 predict that the passage time at the check-point will be equal to the RTA time constraint value, if the wind error is zero. It is also possible to envision the same reasoning, not with a zero wind error, but with a wind error equal to the average of the wind errors encountered in the past, over a time scale to be determined.

A second method consists in positioning it at the limit of the interval i2 which is closest to an extreme air speed criterion.

Depending on the trend of the winds encountered, the interval i2 for its part drifts between the maximum and minimum air speed criteria. This drift can lead to a recalculation of the reference path according to the following logics, dependent on different situations:

when the trend of the winds encountered is such that the interval i2 has not come up against one of the ends of the air speed criteria domain, the means 4 compare, in real time, the difference between the chosen air speed criterion and the air speed criterion that would be chosen if the reference path were recalculated. This difference would correspond to a deceleration/acceleration if the reference path were recalculated. As long as this deceleration/acceleration is less than a predetermined threshold, the air speed criterion remains unchanged. Thus, the use of excessively frequent recalculations (which are costly in terms of processor availability) is avoided as is the use of almost constant guidance corrections (which are prejudicial to the comfort of the passengers and fuel consumption);

when the trend of the winds encountered is such that the interval i2 comes up against one of the ends of the air speed criteria domain, the means 4 recalculate the reference path with a new air speed criterion. In this case, it is wise to distance the interval i2 from the limit up against which it comes as quickly as possible, and this in order to:

make it possible to find a top or bottom air speed criterion correction margin (the one that has disappeared on the appearance of the endstop); and avoid a narrowing of the interval i2 which could occur if the drift of this interval were to continue in the same direction.

To do this, one solution is to correct the air speed criterion by bringing it to the value of the endstop limit. This action makes it possible to reverse the drift of the interval i2 and make best use of the air speed envelope by reverting to the situation described previously.

For the guidance of the aircraft, the means 4 recalculate, in real time, the speed target that is associated with the air speed criterion chosen for the calculation of the reference path and transmit this speed target to the means 7 which monitor the latter (in particular with an automatic pilot or an auto-throttle, depending on case).

The second embodiment variant includes many logics in common with the first abovementioned embodiment variant. Only the logic differences are explained hereinbelow.

In this second embodiment variant, the servo-control of the guidance in time is handled directly by the means 7. The means 4 calculate the reference path and then send it to the means 7, together with a time target (or pseudo-RTA) with a tolerance calculated by said means 4, for the next waypoint that the aircraft must sequence.

The way in which the value of the time target (or pseudo-RTA) is defined depends on the waypoint concerned:

if the waypoint is a point other than the point where the RTA time constraint is entered, the time target at the waypoint is an intermediate time calculated by the means 4 for the aircraft to observe the time constraint. This required intermediate passage time is equal to the passage time predicted (without wind error) by the means 4 at the waypoint at the moment when the vertical profile (relative to the reference path) has been calculated for the last time; and if the waypoint is the point where the RTA time constraint is entered, the time target sent to the means 7 is equal to the value of said entered RTA time constraint.

The way in which the tolerance is defined depends on the point concerned:

if the waypoint is a point other than the point where the RTA time constraint is entered, the tolerance corresponds to the range of the passage times that can be observed at the next waypoint with a range of air speed criteria equal to the abovementioned interval i2. To obtain this range of possible times, the means 4 perform the same type of calculation as described previously, using the interval i2 instead of the complete range of air speed criteria. There is no reason for, at the next waypoint, the range of possible passage times with the interval i2 to be centered around the pseudo-RTA value. Two tolerance values are therefore obtained, namely one for the passage times more forward of the pseudo-RTA value, and the other for the passage times more backward of the pseudo-RTA value; and if the waypoint is the point where the RTA time constraint is entered, a single tolerance value is supplied to the means 7 (which is valid for both the passage times that are more forward and the passage times that are more backward than the pseudo-RTA). In this case, the tolerance value is equal to the entered error margin value.

The means 7 generate guidance instructions by direct servo-control on the time target at the next waypoint. When the difference between the actual passage time at the next waypoint (the means 7 calculate predictions based on taking into account the maximum wind error and knowledge of the distance obtained by traveling along the reference path between the current position of the aircraft and said waypoint) and the time target at this same point becomes significant and risks exceeding the tolerance value or values, said means 7 order an acceleration or a deceleration such that the error is acceptable at the waypoint concerned.

The invention claimed is:

1. A method for assisting guidance of an aircraft, the method comprising the steps of:

entering into a time constraint entry unit at least one time constraint relating to a passage time at a check-point in a flight of the aircraft;

determining, by an information source, values of first flight parameters relating to the flight of the aircraft;

determining, by a flight management system, guidance instructions including speed instructions to guide the aircraft to said check-point at said passage time, wherein said guidance instructions are determined from said values of first flight parameters and the at least one time constraint entered into the time constraint entry unit;

generating, by an accuracy generating unit, an accuracy level for complying with said time constraint, said accuracy level representing a maximum allowable difference between a required passage time and an actual passage time at said check-point and at least one error level for at least one of said first flight parameters;

determining, by a margin determining unit, an operating margin for at least one second parameter, which is representative of air speed level of the aircraft, said operating margin representing a range of air speed criterion values of the aircraft, wherein the operating margin is determined from said accuracy level and from said at least one error level;

determining, by a range determining unit, whether the operating margin representing the range of air speed criterion values is within an air speed envelope of the aircraft, said air speed envelope comprising air speeds at which the aircraft can fly between its current position and said check-point;

modifying said speed instructions, by a speed modifier, when said range of air speed criterion values is not within said air speed envelope, said speed instructions being modified to be within said air speed envelope;

determining a reliable time domain, by the flight management system, which corresponds to a passage time domain that the aircraft can observe at said check-point with said accuracy level, including a probability level; and presenting, on a display screen, to a pilot of the aircraft at least one of the following:

a graph illustrating the reliable time domain; and information that said reliable time domain cannot be attained.

2. The method as claimed in claim 1, wherein:

an operator enters the at least one time constraint into the time constraint entry unit;

the constraint value entered by the operator is compared to said reliable time domain; and the operator is notified when a time constraint value is located outside of said reliable time domain.

3. The method as claimed in claim 2, wherein, when the time constraint value is located within said reliable time domain, the guidance of the aircraft is servo-controlled so as to reach, at said check-point, with said accuracy and probability levels, said time constraint value entered by the operator.

4. A device for assisting guidance of an aircraft, said device comprising:

time constraint entry unit into which at least one time constraint relating to a passage time at a check-point in a flight of the aircraft is entered;

information source that determines values of first flight parameters relating to the flight of the aircraft;

accuracy generating unit that generates at least one error level for at least one of said first flight parameters and an accuracy level for complying with said time constraint, said accuracy level representing a maximum allowable difference between a required passage time and an actual passage time at said check point;

flight management system and flight computer, linked to one another, which determine from said values of said first flight parameters and said at least one time constraint, guidance instructions comprising speed instructions to guide the aircraft to said check-point at said passage time;

margin determining unit that determines, from said accuracy level and from said at least one error level, an operating margin for at least one second parameter, which is representative of air speed level of the aircraft, said operating margin representing a range of air speed criterion values of the aircraft;

range determining unit that determines whether the operating margin representing the range of air speed criterion values is within an air speed envelope of the aircraft, said air speed envelope comprising air speeds at which the aircraft can fly between its current position and said check-point; and speed instruction modifier that modifies said speed instructions when the range of air speed criterion values is not within said air speed envelope, said speed instructions being modified to be within said air speed envelope, wherein:

the flight management system is configured to determine a reliable time domain which corresponds to a passage time domain that the aircraft can observe at said check-point with said accuracy level, including a probability level.

5. The device as claimed in claim 4, further comprising at least one actuator that applies said guidance instructions to flight controls of the aircraft during a flight and as far as said check-point.

6. An aircraft, which comprises the device of claim 4.

* * * * *